B. F. SHERRICK.
Ditching-Machine.

No. 207,137. Patented Aug. 20, 1878.

Witnesses
A. Ruppert
J. G. Mason

B. F. Sherrick
Inventor
D. P. Holloway & Co
Att'ys

UNITED STATES PATENT OFFICE.

BENJAMIN F. SHERRICK, OF ELIDA, OHIO.

IMPROVEMENT IN DITCHING-MACHINES.

Specification forming part of Letters Patent No. 207,137, dated August 20, 1878; application filed April 26, 1878.

*To all whom it may concern:*

Be it known that I, BENJAMIN F. SHERRICK, of Elida, in the county of Allen and State of Ohio, have invented new and useful Improvements in Ditching-Machines, of which the following is a specification:

The object of this machine is, first, cutting the ditch and depositing the earth on the side, and, secondly, after the ditch is cut and the tile laid in the bottom thereof, throwing the excavated earth back into the ditch again.

Figure 1:
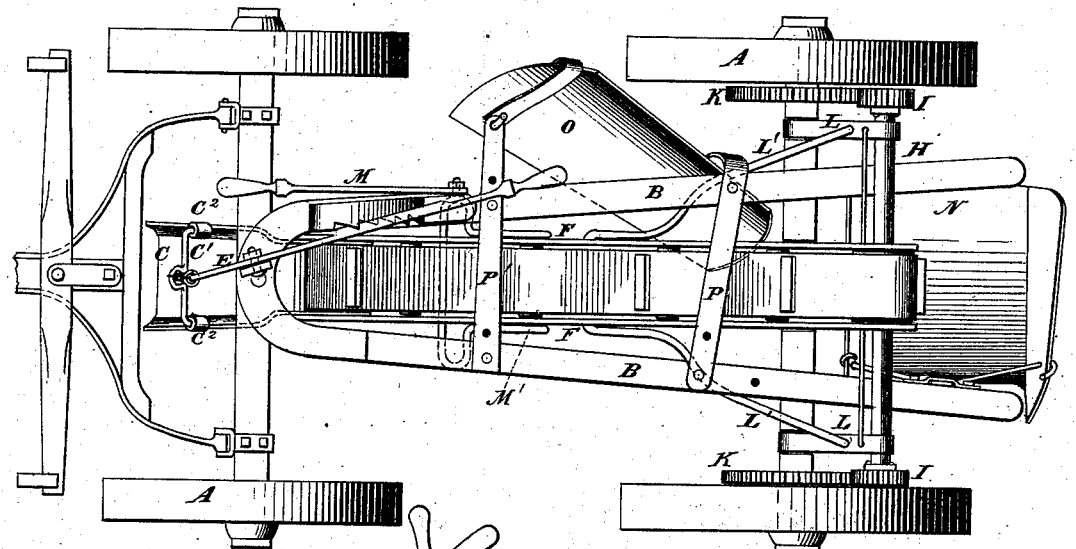
Figure 2:
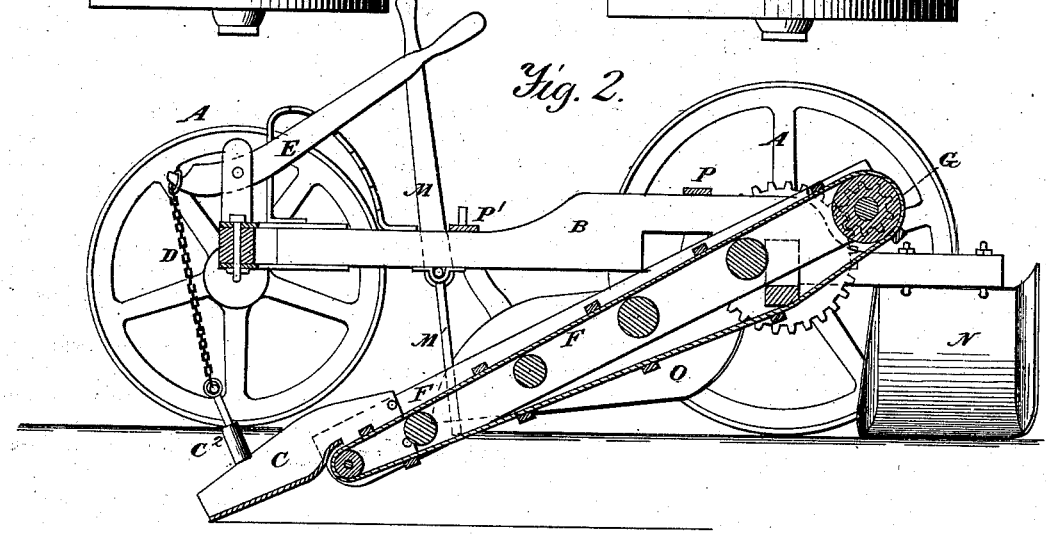
Figure 3:
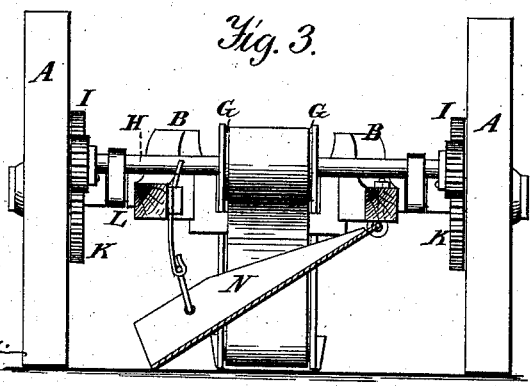

In the annexed drawing, making a part of this specification, Figure 1 is a plan view. Fig. 2 is a longitudinal central section. Fig. 3 is a rear elevation of the machine.

The same letters are employed in all the figures in the indication of identical parts.

The machine is carried upon wheels A, the axles of which are connected by the main frame B. C is the scoop for cutting the ditch. It is provided with a bail, $C^1$, for suspending it by means of a chain, D, from the short end of a lever, E, and with side rollers, $C^2$, for the diminution of friction against the sides of the ditch. The scoop is attached firmly to the side pieces, F, forming the sides of a trough, the bottom of which is formed by the endless belt or apron F', which serves as an elevator for the earth detached by the action of the scoop C. The trough rests on the bent axle, and, when the scoop end is raised or depressed, turns on the axle as a center of oscillation.

Motion is given to the endless apron by a drum, G, on the counter-shaft H, driven by pinions I, keyed thereto, and driven by spur-wheels K, fastened to the hubs of the hind wheels.

The counter-shaft H has its bearing in swinging arms L, attached to and turning on the hind axle, and being consequently concentric with the spur-wheels K. By this arrangement of the driving-gearing the scoop and elevator may be raised or lowered indefinitely, as the spur-pinion I will revolve around the spur-wheel K, keeping the cogs constantly in mesh, and consequently giving motion to the apron F', whatever may be its angle of inclination.

The arms L are braced by means of brace-rods L', pivoted to the sides F of the elevator-trough. The elevator-trough is supported near its front end on a stirrup, M', actuated by the hand-lever M, for the purpose of supporting the elevator at any required angle. The earth raised by the elevator is thrown upon a transverse trough, N, hinged to the frame on one side, and adjustably supported by the frame on the other, so that the earth raised by the elevator may be discharged on the side of the ditch.

When the ditch has been dug and the tile laid, the earth which has been thrown out may be restored to the ditch by means of the shovel O, which is attached to the side of the machine by means of the hangers P P'. These hangers are attached to the frame by means of pins passing into one of a series of holes, by means of which the shovel may be set nearer to or farther from the frame.

When the covering-shovel is attached the scoop and elevator should be detached, which may be done by detaching the yoke which fastens the arm L to the axle, and also detaching the chain D and stirrup M' and disconnecting the carrier-belt.

What I claim as my invention, and desire to secure by Letters Patent, is—

1. The convertible ditch excavating and filling machine, combining in its construction the detachable scoop and elevator, and a detachable side shovel, O, substantially as and for the purpose set forth.

2. In combination with the frame B and shovel O, the adjustable hangers for regulating the position of the side shovel, substantially as set forth.

In testimony that I claim the foregoing as my own I affix my signature in presence of two witnesses.

BENJAMIN F. SHERRICK.

Witnesses:
 S. S. SHERRICK,
 CHARLES B. RICE